(12) United States Patent
Brecht

(10) Patent No.: US 11,678,281 B2
(45) Date of Patent: *Jun. 13, 2023

(54) METHOD FOR OPERATING A SYSTEM FOR INTRALOGISTIC TRANSPORT AND SYSTEM

(71) Applicant: SEW-EURODRIVE GMBH & CO. KG, Bruchsal (DE)

(72) Inventor: Roland Brecht, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 151 days.

This patent is subject to a terminal disclaimer.

(21) Appl. No.: 17/485,772

(22) Filed: Sep. 27, 2021

(65) Prior Publication Data

US 2022/0015048 A1    Jan. 13, 2022

Related U.S. Application Data

(63) Continuation of application No. 15/029,954, filed as application No. PCT/EP2014/002636 on Sep. 29, 2014, now Pat. No. 11,134,454.

(30) Foreign Application Priority Data

Oct. 17, 2013    (DE) ..................... 10 2013 017 280.2

(51) Int. Cl.
*H04W 56/00* (2009.01)
*G06Q 50/30* (2012.01)
(Continued)

(52) U.S. Cl.
CPC ........ *H04W 56/001* (2013.01); *G05D 1/0022* (2013.01); *G05D 1/0027* (2013.01);
(Continued)

(58) Field of Classification Search
CPC ........... H04W 56/001; H04W 56/0015; H04W 56/0085; H04W 84/12; H04W 64/00;
(Continued)

(56) References Cited

U.S. PATENT DOCUMENTS 8,730,867 B2 * 5/2014 Defrance .......... H04W 56/0035
370/324
2009/0016475 A1    1/2009 Rischar et al.
(Continued)

FOREIGN PATENT DOCUMENTS

CN          202677192 U      1/2013

OTHER PUBLICATIONS

International Seach Report, dated Dec. 15, 2014, issued in corresponding International Applicagtion No. PCT/EP2014/002636.
(Continued)

*Primary Examiner* — Hardikkumar D Patel
(74) *Attorney, Agent, or Firm* — Carter, DeLuca & Farrell LLP

(57) ABSTRACT

In a method for operating a system for intralogistic transport and system, the system having subscribers, in particular vehicles, which are connected via a data transmission channel such that each subscriber is a subscriber of a group of subscribers connected for data transmission via the data transmission channel, the data transmission being in particular not real-time capable, the data transmission channel being in particular a WLAN connection, each subscriber having a time base, in particular a clock, a group is formed; the time base of each subscriber of the group is synchronized, that is, in particular the time of the time base of the subscriber modified by a specific time offset by the synchronization is used as the time for operation; and subscribers are moved in dependence on a respective subscriber functioning as a master or in mutual dependence, in particular the
(Continued)

position activated by the respective subscriber, in particular at the respective point in time, depending on the respective position of at least one other subscriber of the group or on the respective position of multiple or all other subscribers of the group.

20 Claims, 5 Drawing Sheets

(51) Int. Cl.
| | | |
|---|---|---|
| *G06Q 10/08* | (2023.01) | |
| *H04J 3/06* | (2006.01) | |
| *G05D 1/00* | (2006.01) | |
| *H04L 7/00* | (2006.01) | |
| *H04L 67/12* | (2022.01) | |
| *H04W 84/12* | (2009.01) | |

(52) U.S. Cl.
CPC ............ *G06Q 10/08* (2013.01); *G06Q 50/30* (2013.01); *H04J 3/0667* (2013.01); *H04L 7/0008* (2013.01); *H04L 67/12* (2013.01); *H04W 56/0015* (2013.01); *H04W 56/0085* (2013.01); *G05D 2201/02* (2013.01); *H04W 84/12* (2013.01)

(58) Field of Classification Search
CPC ......... H04W 56/0055; H04W 56/0035; H04W 84/20; G05D 1/0022; G05D 1/0027; G05D 2201/02; G06Q 10/08; G06Q 50/30; H04J 3/0667; H04J 3/0697; H04L 7/0008; H04L 67/12; G01S 5/10
See application file for complete search history.

(56) References Cited

U.S. PATENT DOCUMENTS

| | | | |
|---|---|---|---|
| 2011/0161701 A1 | 6/2011 | Blixt et al. | |
| 2012/0252503 A1* | 10/2012 | Wu | ............................ G01S 5/10 |
| | | | 455/456.6 |
| 2013/0223496 A1 | 8/2013 | Buhl et al. | |

OTHER PUBLICATIONS

International Preliminary Report on Patentability issued in PCT/EP2014/002636, dated May 4, 2016.

J. Elson et al., "Fine-Grained Network Time Synchronization using Reference Broadcasts," Proceedings of the 5th Symposium on Operating Systems Design and Implementation(OSDI 2002), Dec. 2002.

* cited by examiner

METHOD FOR OPERATING A SYSTEM FOR INTRALOGISTIC TRANSPORT AND SYSTEM

CROSS-REFERENCE TO RELATED APPLICATIONS

The present application is a continuation of U.S. patent application Ser. No. 15/029,954, which is the national stage of PCT/EP2014/002636, having an international filing date of Sep. 29, 2014, and claims priority to Application No. 102013017280.2, filed in the Federal Republic of Germany on Oct. 17, 2013, each of which is expressly incorporated herein in its entirety by reference thereto.

FIELD OF THE INVENTION

The present invention relates to a method for operating a system for intralogistic transport and to a system.

BACKGROUND INFORMATION

It is generally known that driverless transport systems, that is, FTS or automatically guided vehicles, AGV, are suitable for intralogistic transport.

SUMMARY

Example embodiments of the present invention perform a logistic transport task using multiple vehicles connected via a data transmission line for communication, where the data transmission is not real-time capable.

According to an example embodiment of the present invention, with respect to the method for operating a system for intralogistic transport:

the system has subscribers, in particular vehicles, which are connected via a data transmission channel such that each subscriber is a subscriber of a group of subscribers connected for data transmission via the data transmission channel, the data transmission being in particular not real-time capable, the data transmission channel being in particular a WLAN connection, each subscriber having a time base, in particular a clock, wherein a group is formed, the time base of each subscriber of the group is synchronized, that is, in particular the time of the time base of the subscriber modified by a specific time offset by the synchronization is used as the time for operation, subscribers are moved in dependence on a respective subscriber functioning as a master or in mutual dependence, in particular the position activated by the respective subscriber, in particular at the respective point in time, depending on the respective position of at least one other subscriber of the group or on the respective position of multiple or all other subscribers of the group.

It is possible to perform a mutually dependent movement of the subscribers in spite of the fact that the data transmission connection is not real-time capable. For it is possible for the subscriber to store the guide values or field bus control words in a buffer memory and then to execute them without interruption—even if the data connection is not real time capable, that is, if data is transmitted only periodically at a high data transmission rate. For the synchronization makes it possible to execute the buffered commands or to activate the buffered guide values in a simple manner and synchronized in terms of time among the subscribers of the group.

A criterion may be used to form the group, the criterion in particular concerning the reachability by the data transmission via the data channel, the distance from a first subscriber, the distance from a position, in particular a position in space.

An advantage in this regard is that the group may be formed in a simple manner. In particular, it is also possible to achieve the logistic objective in a quick and simple manner because the subscribers, in particular vehicles, quickly team up as a group.

The movement of the subscribers may be performed in dependence on one respective subscriber functioning as a master or in mutual dependence according to the principle of the electronic cam disc or according to the principle of the electronic transmission or as another combined kinematics movement having a virtual guide value reference.

It is advantageous in this regard that time-synchronized kinematics movements are made possible in spite of the fact that the connection is not real-time capable.

A first subscribers may transmit a master telegram to the group, in particular as a broadcast telegram, and each subscriber of the group thereupon transmits a response telegram, where i numbers the subscribers of the group consecutively, when dispatching the master telegram, the associated time t1 being added by the first subscriber as a time stamp to the master telegram, the respectively receiving subscriber, that is, the respectively ith subscriber, adding the time stamp $t2\_i$ when receiving the master telegram, the ith subscriber, when dispatching the response telegram, adding the time stamp $t3\_i$, and the master, when receiving the response telegram, adding the current time stamp t4, the first subscriber, which dispatched the master telegram, determining an estimate $dt1\_i$ for the propagation time, in particular according to $$dt1\_i = ((t4-t1)-(t3\_i-t2\_i))/2.$$

It is advantageous in this regard that it is readily possible to determine a synchronized time from the time stamps, particularly if multiple time stamps are taken into account in a temporally recurring manner. In the process, the data transmission line is measured so to speak. This is based on the assumption that the transmission time from the first subscriber to the respectively receiving subscriber equals the transmission time from the respectively receiving subscriber to the first subscriber.

The synchronization, that is, in particular the time offset, may be determined in that for each response signal of the ith subscriber, the value $t2\_i$ is respectively used as the setpoint value $t\_setpoint\_i$, and $t\_actual\_i$, which is determined as the sum $(t1+dt1\_i)$, is used as the actual value, the setpoint value and the actual value being supplied to a controller element, the deviation between the setpoint value and the actual value being in particular multiplied by the respective quality code number $GK\_i$ and then being supplied to the controller element, the controller element being in particular a linear element, in particular a PI element, the, in particular limited, output signals of the respective controller elements being added together and the synchronized time being determined therefrom, in particular in that the summed signal is divided by the number of subscribers of the group and the result is multiplied by a code number that represents the synchronization readiness, and the signal thus obtained is used to correct the synchronized time, in particular including a limitation and average value filtering, the current synchronized time being in particular determined from the previously synchronized time in that the signal produced in this manner or at least a portion of the same is added to the previously determined synchronized time. It is advantageous in this regard that the synchronized time may be corrected in a simple manner in accordance with $t\_k=t\_k-1+Y\_result$, where $t\_k$ is the current synchronized time at time step k, $t\_k-1$ is the previously determined synchronized time, that is, the synchronized time at time step k−1, and $Y\_result$ is the signal used for the correction.

The code number for representing the synchronization readiness may be determined according to
$SB\_i=MAX(100\%-GK\_i+SB\_BASIC, 100\%)$, where $GK\_i$ is the quality code number of the ith subscriber having the controller, in particular of the ith subscriber of the group, in particular of the vehicle, and $SB\_BASIC$ is a specifiable parameter. It is advantageous in this regard that a code number is used that is readily determinable.

In order to determine the quality code number of the synchronization of the group, for every subscriber of the group, the respective absolute value of the respective differences between the synchronized time and the setpoint value associated with this subscriber, in particular with the ith subscriber of the group, may be monitored to determine whether it falls below a critical value, in particular a threshold value, EPSILON, and, if the critical value is undershot, the absolute value is supplied to a quality code number ascertainment unit, the output signal of which represents the quality code number. It is advantageous in this regard that for every sufficiently synchronized subscriber, a binary signal having the value HIGH is supplied to the quality code number ascertainment unit and that thus it is possible to determine the quality code number in a simple manner by adding up the binary signals.

A respective quality code number, in particular of the ith subscriber, may be determined in accordance with $$GK\_i=k*100\%/m,$$

where k=number of cycles from the last m cycles, in which the gap between a synchronization setpoint value and a synchronization actual value is smaller than a threshold value or a critical value EPSILON. It is advantageous in this regard that it is possible to carry out the determination of the quality code number of the ith subscriber of the group in a quick and simple manner.

Among features in the system for implementing a previously mentioned method are that the subscribers are provided as vehicles, such as FTS or AGV, and respectively have a device for transmitting and/or receiving data, in particular telegrams, via the data transmission channel.

It is advantageous in this regard that in order to solve a logistic task vehicles are movable in mutual dependence, the data transmission line not being real-time capable and nevertheless a synchronized movement of the vehicles being possible. In order to allow for a simple execution, the guide values to be targeted, that is, the time-dependent position setpoint values, are stored in a buffer memory, which assigns the respective guide value to the respective time step and then performs the execution of the movement in a manner that is delayed by an offset value, the time steps, however, being executed in the synchronized time.

Additional features, aspects, and advantages of example embodiments of the present invention are described in more detail below with reference to the appended Figures.

DETAILED DESCRIPTION

Figure 1:
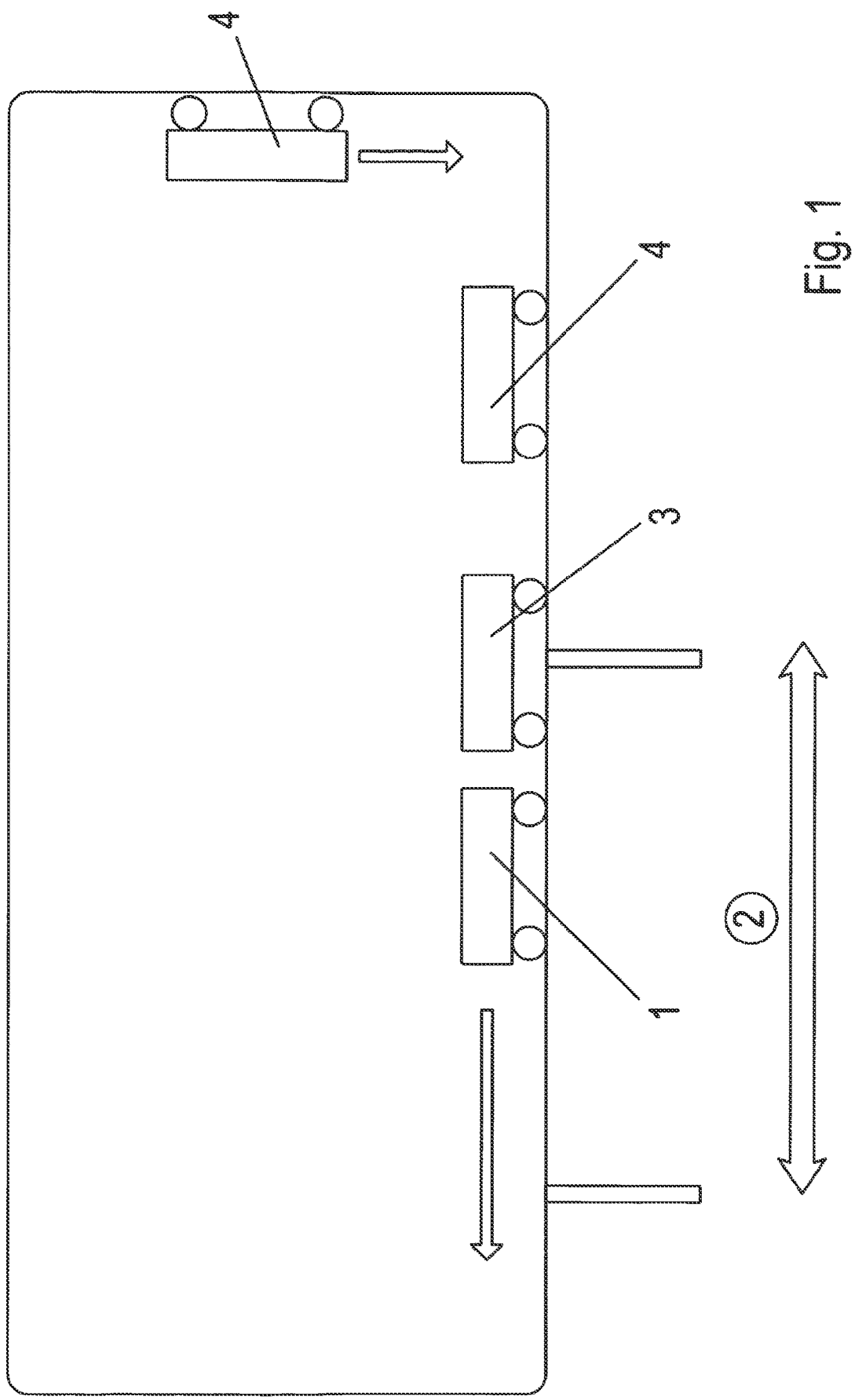
FIG. 1 schematically illustrates a logistics system.
Figure 2:
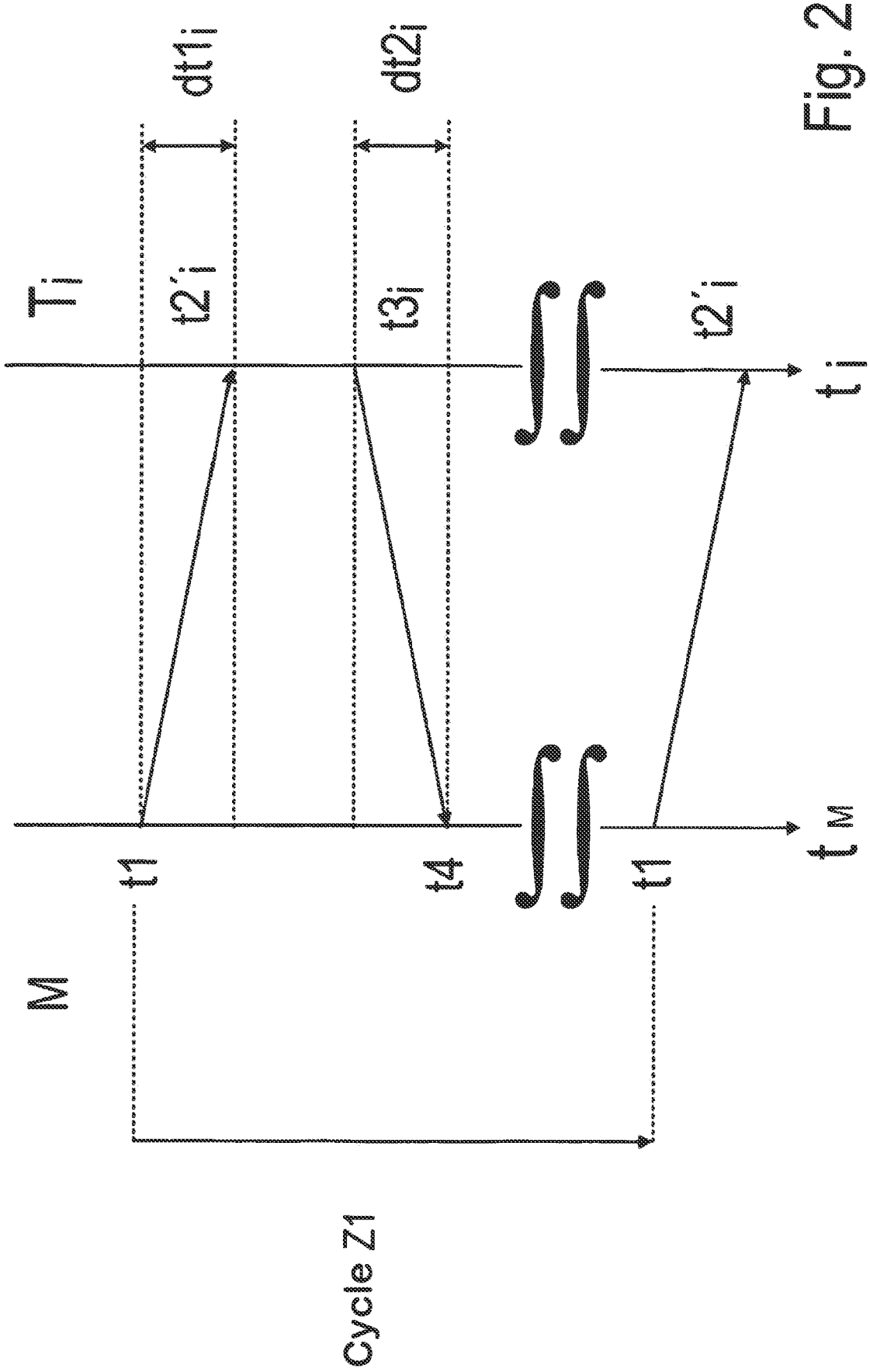
FIG. 2 schematically illustrates the synchronization timing.

Example embodiments of the present invention provide for a system of vehicles, for example automatically guided vehicles (AGV) and/or driverless transport systems (FTS), which are respectively designed as bus subscribers. For this purpose, the vehicles have an electronic circuit, which is arranged as a transmitter and/or receiver for a data transmission, in particular for a contactless data transmission. Preferably it is possible to establish between the vehicles a data transmission, such as a WLAN connection, etc., that is not strictly clock-synchronized and/or not real-time capable.

The vehicles, that is, mobile units, also have a position finding capabilities such that they are able to determine at least their approximate position.

In order to perform a logistic task—for example one that is specified by a central control unit—a group of vehicles is formed.

In this respect, the task requires a synchronized movement of the vehicles. This may occur, for example, according to the principle of the electronic cam disk, the electronic transmission or other composite kinematics movements having a virtual guide value reference. For this purpose, one vehicle is used as a guide value provider and its time-dependent position, in particular its setpoint position, is communicated to the other vehicles of the group, which then head for a respective position that depends on the position of the guide value provider.

In the simplest case, the task is to form a traveling column, that is, to follow the respective guide value provider at a constant distance and/or to maintain a constant distance with respect to the most proximate vehicle. It may also be the case that a transport operation with group participation, that is, a multi-vehicle operation is required, an object being picked up by multiple vehicles and being transported jointly, it being necessary for this purpose that the vehicles maintain a constant distance with respect to the guide value provider vehicle.

The group formed ad hoc in each instance is not foreseeable such that it is not possible to form a synchmaster in accordance with IEC 1588 for the purpose of the synchronization. For it is not foreseeable which vehicle is able to be determined, to be negotiable or usable as synchmaster.

Each vehicle, to be sure, has a time base, that is, a clock, but the clocks of the vehicles must be synchronized since the data transmission does not occur strictly cyclically and in clock-synchronized fashion, but rather in data packets that required different times from the transmitter to the receiver, as is used with the Ethernet or Internet.

The vehicles may also be arranged as robots for example.

In order to form the group, the vehicles come together dynamically and separate again in the same manner. A synchmaster would thus not be practically determinable or would at least result in a lack of reliability or in the risk of a deadlock.

The group is formed according to a criterion. For example, a transport task is to be performed beginning from a certain start position, multiple vehicles being necessary for this task. A first vehicle is assigned the task because this is either determined by the central control unit or because it happens to be traveling by the start position. The group is then formed in accordance with the criterion. The criterion is, for example, that a distance value is undershot between the first vehicle and a respective additional vehicle. It is thus possible to form the group from vehicles that are available, that declare themselves to be available and/or that are as close as possible to the first vehicle or the start position.

If the vehicles are arranged as rail vehicles, then the criterion may also be specified as a track on which the vehicles must be located. In the case of vehicles traveling on a floor, it is possible to specify an area, those vehicles that are located in the area being added to the group. In the case of vehicles that are able to be positioned spatially, it is possible to realize the criterion by specifying a spatial region, those vehicles that are located in the spatial region being added to the group. Alternatively, it is also possible to realize the criterion as the specification that all vehicles that are reachable via the data transmission connection, in particular reachable from the first vehicle, are added as subscribers to the group. Thus, it is possible to use a communication-related criterion, rather than a geometrical criterion.

FIG. 1 illustrates in exemplary fashion a track 2, on which rail-mounted vehicles 1 and 3 are located. Additional vehicles 4 are situated outside of track 2, in particular at a distance from track 2, and thus cannot be included in the group.

An assigned task could be, for example, to pick up a palette from position 1 and for two vehicles (1, 3) to transport it to a destination position, it being a necessary requirement that only suitable vehicles be used, whose features are suitable for accomplishing the logistic task and the features of the vehicles being stored in an attribute table.

Another logistic task would be for vehicles within one position area, that is, within one specified track, area or spatial region, to perform a column operation, that is, to close up to one another in a synchronized manner. For this purpose, it is necessary to maintain a constant distance during the column operation such that it is possible to maintain the distance with respect to the nearest vehicle of the group as constant as possible.

The vehicles of the group respectively have an address that is biuniquely associated with the vehicle for the transmission of data, that is, an item of biunique identification information.

Upon the formation of the group, each vehicle determines a cycle time Z1 and then transmits, in a temporally recurring manner and at a respective time interval Z1, a master telegram as a broadcast telegram, that is, as a telegram that is directed at least to all vehicles of the group.

Following the reception of this master telegram, each vehicle of the group sends back a response telegram.

When dispatching the master telegram, the associated time t1 is added as a time stamp to the master telegram. The respectively receiving vehicle, that is, the ith subscriber, where i numbers the vehicles of the group consecutively, adds the time stamp $t2\_i$ upon receiving the master telegram. When dispatching the response telegram, the ith subscriber adds the time stamp $t3\_i$, and the master, upon receiving the response telegram, adds the respectively current time stamp t4.

Thus, the vehicle that dispatched the master telegram is able to determine an averaged telegram propagation time estimate detected at time tin accordance with $$dt1\_i = ((t4-t1)-(t3\_i-t2\_i))/2,$$

this telegram propagation time referring to the ith subscriber, that is, the ith vehicle of the group. It is thus possible to determine an estimate for the propagation time of the telegram transmission between the vehicle having transmitted the master telegram and each of the other vehicles of the group. For this purpose, the assumption is taken into account that the propagation time is identical in both directions.

In addition, it is possible to determine a quality code number for the synchronization state of the ith subscriber in accordance with $$GK\_i = 100\% * k/m,$$

where k is the number of those cycles of the last m cycles, in which the difference between the synchronization setpoint value and the synchronization actual value is smaller than a critical value EPSILON.

The cycle frequency may be defined as $S\_MAX/(n*n)$, where S_MAX is a specifiable value, which represents the maximum telegram load of the data transmission per unit of time, and n represents the number of subscribers in the group.

Figure 5:
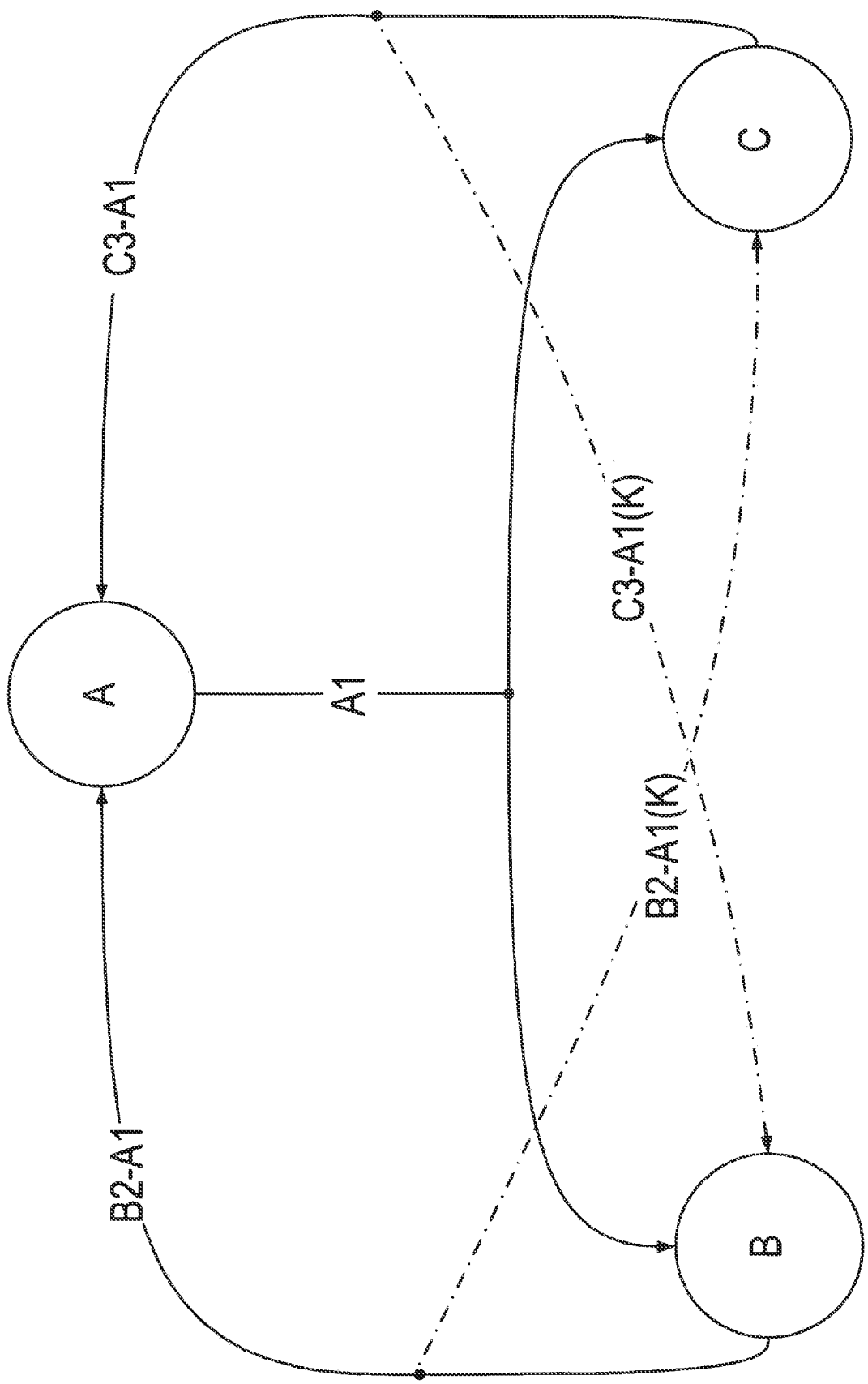
FIG. 5 schematically illustrates the message principle.

FIG. 5 illustrates that subscriber A transmits master telegram A1 and that response telegrams B2-A1, C3-A1 are transmitted. The response telegrams B2-A1 and C3-A1 are the response telegrams that are also monitored by subscriber C and B, respectively.

Figure 3:
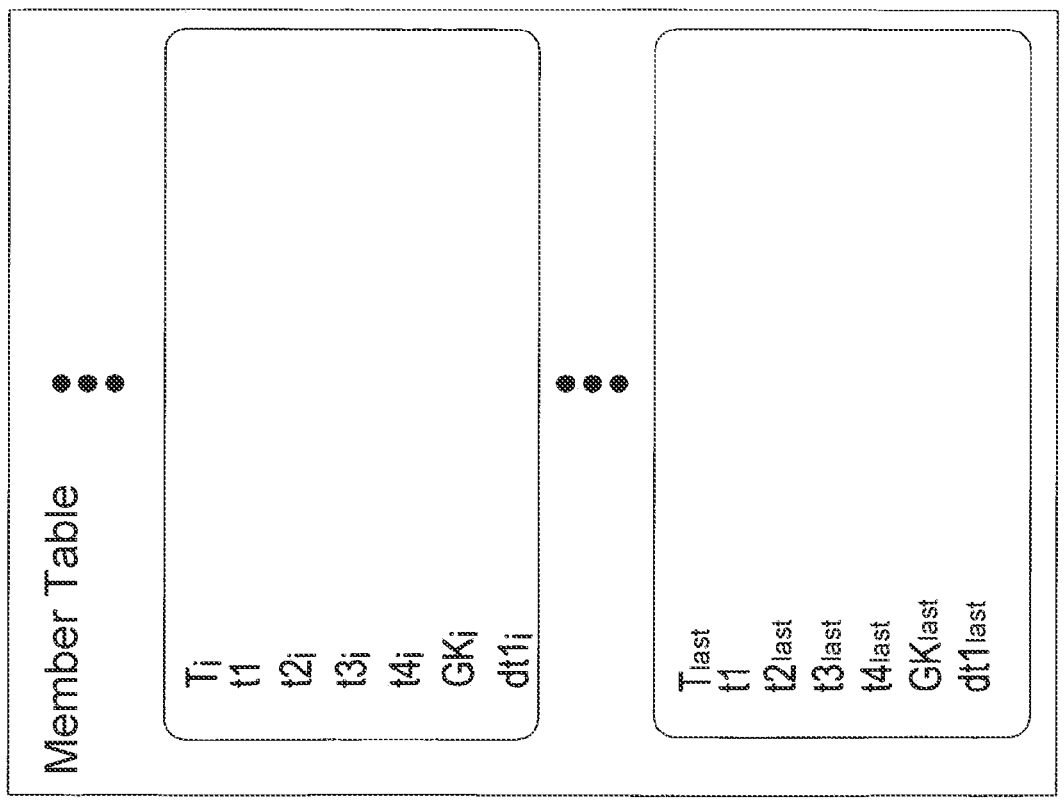
FIG. 3 schematically illustrates the group member table.

Each subscriber records in a respective table the data associated with the respectively other subscriber of the group, as shown in FIG. 3. For synchronizing the time bases of the subscribers, it is necessary to determine the time offset between the time bases of the subscribers. To this end, the time-stamp data described above are evaluated. For this purpose, the time offset between the time bases is determined using a controller. To determine the input variables, it is possible to determine for every subscriber of the group respectively a setpoint value and an actual value for the controller. For this purpose, the value $12\_i$ is used as the respective setpoint value, that is, synchronization setpoint value $t\_setpoint\_i$, and as the actual value, that is, synchronization actual value, $t\_actual\_i$, which is determined as the sum $(t1+dt\ 1\_i)$. Here, index i numbers the subscribers of the group consecutively, that is, it assumes an integral value from 1 through n.

Figure 4:
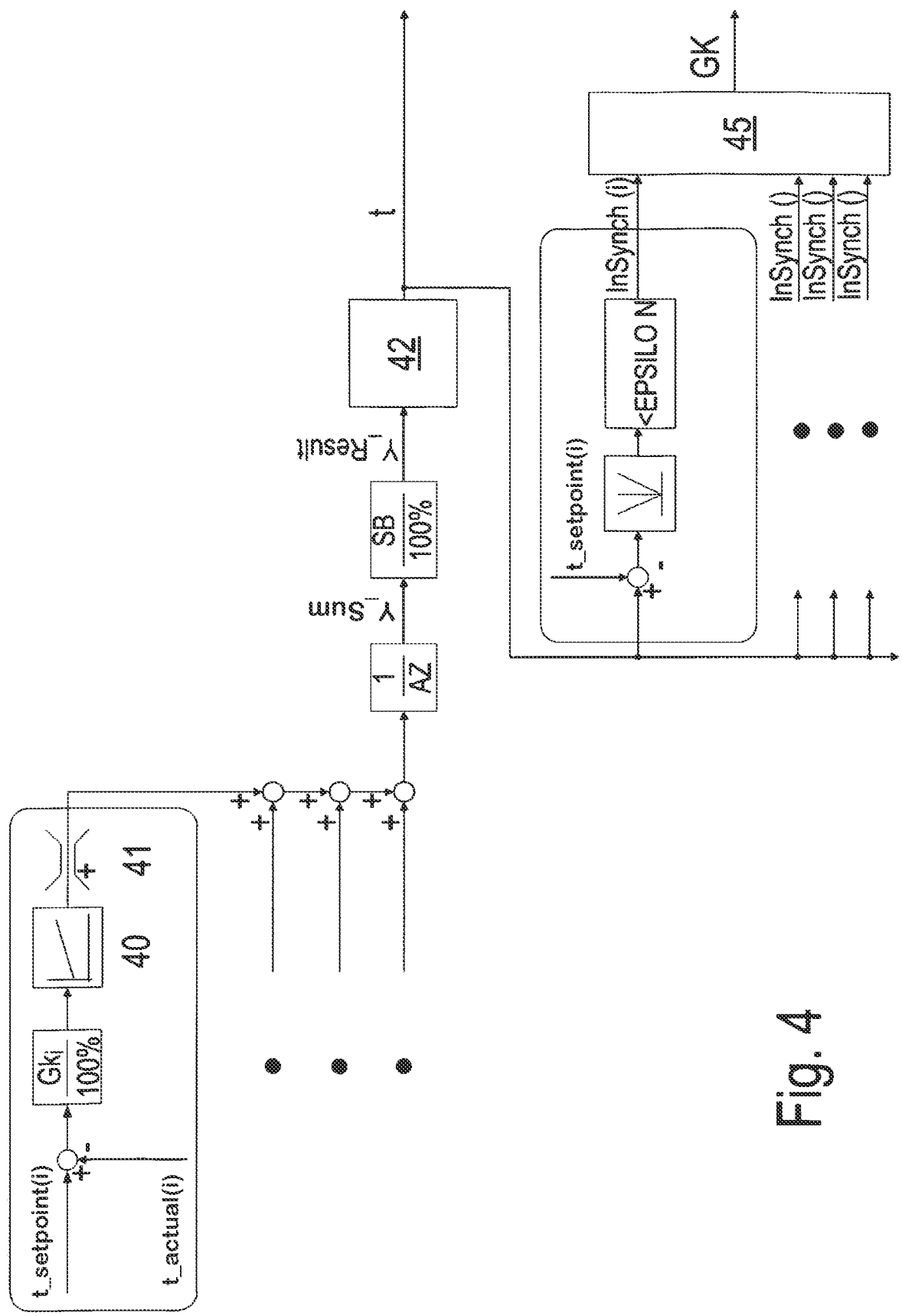
FIG. 4 schematically illustrates the multi-master-clock synchronization controller.

As illustrated in FIG. 4, the difference between the setpoint value and the actual value is multiplied by a quality code number and is then provided to controller 40, which may be arranged as a linear controller such as a PI controller, for example.

The control variable determined by controller 40 is passed through a limiter element 41, and the output signal thus determined is summed up with the other analogously determined output signals with respect to the other subscribers of the group.

The composite signal obtained in this manner is divided by the number AZ of subscribers of the group and is multiplied by a factor representing the synchronization readiness, that is, code number SB, and the signal thus obtained is supplied to a compensating element 42 for adjusting the phase according to the time, in particular by limitation and averaging, the output signal of which represents time t, that is, the synchronized time base.

For this purpose, in the most simple variant, the current synchronized time is determined in the compensating element according to $t\_k=t\_k-1+b*Y\_result$, where $t\_k$ is the current synchronized time at time step k, $t\_k-1$ is the previously determined synchronized time, that is, the synchronized time at time step k−1, Y_result is the signal used for the adjustment, k numbers the time steps and b has the value 1 or is a value between 0 and 1, in particular where a limitation and/or an average value filtering are additionally applied.

The code number SB for synchronization readiness indicates how quickly and intensely the adjustment is being made to the setpoint values of the other subscribers. This code number depends on the quality code number. This means that a subscriber that newly joins the group for example, having a lower quality code number GK_i, for example zero, has a very high synchronization readiness. By contrast, a subscriber having a high quality code number has a lower synchronization readiness.

Hence, subscribers having a lower quality code number synchronize more quickly to the subscribers having a high quality code number GK. In other words, the times of the subscribers having a high quality code number establish themselves more quickly and forcefully than the times of the subscribers having a lower quality code number.

The code number of the synchronization readiness is defined as
$SB=MAX(100\%-GK+SB\_BASIC, 100\%)$, where GK is the quality code number of the vehicle having the controller and SB_BASIC is a specifiable parameter.

To determine the quality code number GK, the deviation between a setpoint value t_setpoint_i and the output signal t, that is, the synchronized time base, is determined for each subscriber, and this deviation is supplied to an absolute-value generation element 43, whose output signal is supplied to a comparison element 44, which compares the output signal with a critical value EPSILON and which prevents the output signal from passing through, that is, it outputs the value zero, if the critical value EPSILON is exceeded.

If the output signal falls below the critical value EPSILON, however, then the synchronization setpoint value is very close to the synchronization actual value and the output signal is passed on by comparison element 44 to the block for quality code number ascertainment 45.

The latter ascertains the quality code number GK from the output signal accordingly ascertained for the other subscribers of the group which are passed through the respective comparison elements 44.

In another exemplary embodiment of the present invention, a cooperative multi-master method is used for determining the synchronization. For this purpose, each subscriber evaluates not only the response telegrams that it has received in response to its transmitted master telegrams, but also the response telegrams of the other subscribers in response to a master telegram of another subscriber. Thus the number of telegrams that are required for a synchronization having a high quality code number GK is markedly reduced. As illustrated in FIG. 5, subscriber B for example also evaluates and uses telegram C3-A1, even though the associated master telegram was not sent by subscriber B.

In another exemplary embodiment of the present invention, robots, mobile units, machine tools or other electric devices are used as subscribers instead of vehicles.

By the synchronization of their time bases, the vehicles of the group are able to perform interpolative motional functions, even though the data transmission between them is not real-time capable. A WLAN connection may be used for this purpose. The synchronized time t is in this instance determined by all vehicles of the group.

The setpoints for the movement may therefore be transmitted in block-wise fashion and subsequently processed, that is, used as setpoint values by the positioning control unit situated in the vehicle, each setpoint value being assigned a time and an interpolated setpoint value curve being determined from these setpoint-time-tuples and being specified for the positioning control unit.

All vehicles use a time offset t_OFFSET for processing the setpoint value curve, t_OFFSET effecting a buffer function such that in the event of a temporary failure in the data transmission, that is, an interruption of the data transmission, the movement sequence nevertheless proceeds without interference. The value t_OFFSET is specified as a parameter for all vehicles of the group. Thus it is possible to achieve a movement sequence that is comparable to a system that uses a strictly clock-synchronized data transmission.

In addition, to be sure, it is possible to introduce event-driven processes. These are executed, however, using only a time offset t_OFFSET so that the interpolation relation remains intact.

In other exemplary embodiments of the present invention, commands are also permitted that become effective without the mentioned time offset t_OFFSET, that is, which could interfere with the interpolated movement sequence. However, if such commands only modify a command synchronization or general parameters of the vehicle, then there is nevertheless no interference with the interpolated movement sequence.

LIST OF REFERENCE CHARACTERS

1 vehicle
2 maximum spatial region
3 vehicle
4 vehicle
40 controller, in particular PI controller
41 limiting element
42 compensating element for adjusting the phase to the time, in particular including limitation and averaging
43 absolute-value generation element
44 comparison element
45 quality code number ascertainment
A subscriber, in particular vehicle 1
B subscriber, in particular vehicle 2
C additional subscriber
GK quality code number
Y_sum variable
Y_result variable
t time
t_setpoint time setpoint value
t_actual time actual value
EPSILON critical value
M master, in particular sender of the master telegram
T_i ith subscriber, in particular ith sender of a response telegram
Z1 cycle
$t_M$ time base of the master
$t\_i$ time base of the ith subscriber T_i
t1 time stamp of the master
t4 time stamp of the master
$t2\_i$ time stamp of the ith subscriber upon reception of the master telegram t3_i time stamp of the ith subscriber when sending the response telegram t2'_i additional time stamp of the ith subscriber upon reception of the master telegram dt1_i time difference between the time stamp of the master when sending the master telegram and time stamp of the ith subscriber when receiving the master telegram dt2_i time difference between the time stamp of the ith subscriber when sending the response telegram and the time stamp of master when receiving the response telegram SB synchronization readiness code number

What is claimed is:

1. A method for operating a system for intralogistics transport, the system having subscribers and/or vehicles, which are connected via a data transmission channel such that each subscriber is a subscriber of a group of subscribers connected for data transmission via the data transmission channel, comprising:
forming a group of subscribers; and
moving the subscribers in accordance with a respective subscriber functioning as a master or in mutual dependence, depending on a respective position of at least one other subscriber of the group or on a respective position of multiple or all other subscribers of the group.

2. The method according to claim 1, wherein the data transmission is not real-time capable and includes a wireless local area network (WLAN) connection, each subscriber having a time base and/or a clock.

3. The method according to claim 1, further comprising synchronizing a time base of each subscriber of the group.

4. The method according to claim 1, wherein a criterion is used to form the group.

5. The method according to claim 4, wherein the criterion includes (a) reachability by the data transmission via the data transmission channel, (b) distance from a first subscriber, and/or (c) distance from (i) a position and/or (ii) a position in space.

6. The method according to claim 1, wherein the movement of the subscribers is performed in accordance with a respective subscriber functioning as a master or in mutual dependence, and (a) according to the principle of an electronic cam disc, (b) according to the principle of an electronic transmission, and/or (c) as a combined kinematics movement having a virtual guide value reference.

7. The method according to claim 1, wherein the movement of the subscribers is carried out in accordance with a respective subscriber functioning as master or in mutual dependence by using values buffered in a memory of the respective subscriber.

8. The method according to claim 7, wherein the values include (a) guide values, (b) a field bus control word, (c) an emergency shutdown command, (d) a quick stop command, (e) a stop function command, and/or (f) a software-related command.

9. The method according to claim 1, wherein a first subscriber of the group transmits (a) a master telegram and/or (b) a broadcast telegram, and each subscriber of the group thereupon transmits a response telegram, where i numbers the subscribers of the group consecutively, when dispatching the master telegram, an associated time t1 being added by a first subscriber as a time stamp to the master telegram, the respective receiving subscriber adding a time stamp t2_i when receiving the master telegram, an ith subscriber, when dispatching the response telegram, adding a time stamp t3_i, and the master, when receiving the response telegram, adding a current time stamp t4, the first subscriber, which dispatched the master telegram, determining an estimate dt1_i for a propagation time, in accordance with the following relationship:

$$dt1\_i = ((t4-t1)-(t3\_i-t2\_i))/2.$$

10. The method according to claim 9, wherein the synchronization is determined in that for each response signal of the ith subscriber, the value t2_i is respectively used as a setpoint value t_setpoint_i, and t_actual_i, which is determined as the sum (t1+dt1_i), is used as a actual value, the setpoint value and the actual value being supplied to a controller element, a deviation between the setpoint value and the actual value being multiplied by a respective quality code and then being supplied to the controller element, output signals of the respective controller elements being added together and the synchronized time being determined from the output signals.

11. The method according to claim 10, wherein the controller element includes a linear element and/or a proportional integral (PI) element.

12. The method according to claim 10, wherein the summed signal is divided by the number of subscribers of the group and the result is multiplied by a code number that represents a synchronization readiness, and the signal Y result thus obtained is used to correct the synchronized time.

13. The method according to claim 10, wherein the current synchronized time being determined according to t_k=t_k−1+b*Y result, where t_k is the current synchronized time at time step k, t_k−1 is the previously determined synchronized time, that is, the synchronized time at time step k−1, and Y result is the signal used for the adjustment, k numbers the time steps and b has the value 1 or is a value between 0 and 1.

14. The method according to claim 1, wherein a quality code number of an ith subscriber of the group is determined in accordance with GK_i=k*100%/m, wherein k=a number of cycles from a last m cycles, in which a gap between a synchronization setpoint value and a respective synchronization actual value is smaller than a threshold value or a critical value.

15. The method according to claim 1, wherein a code number for representing a synchronization readiness of a respective subscriber and/or an ith subscriber is determined in accordance with SB_i=MAX(100%−GK_i+SB_BASIC, 100%), wherein GK_i is a quality code number of at least one of the subscriber having a controller and an ith subscriber, and SB_BASIC is a specifiable parameter.

16. The method according to claim 1, wherein, to determine a quality code number to indicate the synchronization of the group of subscribers, for every subscriber of the group, a respective absolute value of respective differences between a synchronized time and a setpoint value associated with the subscriber and/or an ith subscriber of the group, is monitored to determine whether it falls below a critical value and/or a threshold value, and, if the critical value is undershot, a binary input signal of a quality code number ascertainment unit is set, the output signal of which represents the quality code number for indicating the synchronization of the group of participants.

17. The method according to claim 2, wherein (a) the subscribers include vehicles, (b) the time base includes a clock, (c) the data transmission is not in real time, (d) the data transmission includes a WLAN connection, and/or (e) a time of the time base of the subscriber modified by a specific time offset of the synchronization is used as a time for an operation.

18. The method according to claim 1, wherein (a) the subscribers include vehicles, (b) the data transmission is not in real time, and/or (c) the data transmission includes a wireless local area network (WLAN) connection.

19. A system, comprising:
subscribers including (a) vehicles, (b) driverless transport devices, and/or (c) automatically-guided vehicles, and each including a device adapted to transmit and/or receive data and/or telegrams via a data transmission channel, each subscriber being a subscriber of a group of subscribers connected for data transmission via the data transmission channel;
wherein the system is adapted to perform a method including:
forming a group;
moving the subscribers in accordance with a respective subscriber functioning as a master or in mutual dependence, depending on a respective position of at least one other subscriber of the group or on a respective position of multiple or all other subscribers of the group.

20. The system according to claim 19, wherein the data transmission channel is not real-time capable and includes a wireless local area network (WLAN) connection, each subscriber includes a time base and/or a clock, and the method further comprises synchronizing the time base of each subscriber of the group.

\* \* \* \* \*